F. J. WOLFF.
MEASURING DEVICE.
APPLICATION FILED NOV. 9, 1914.
1,178,896.
Patented Apr. 11, 1916.
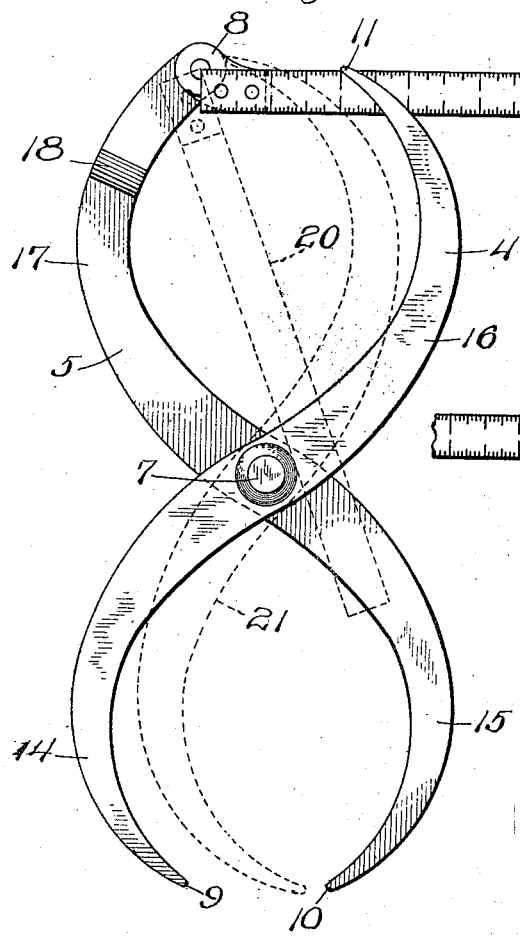
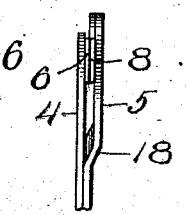
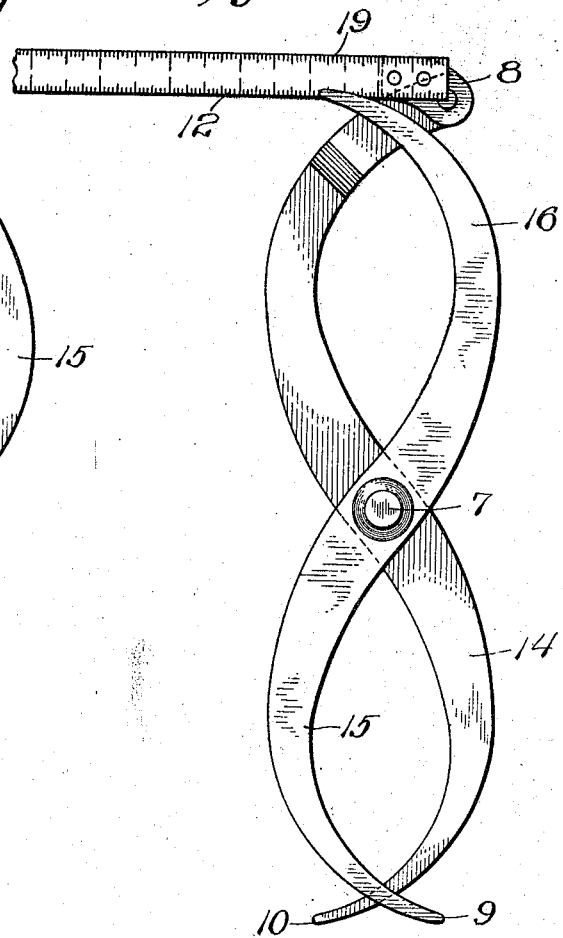
Witnesses:
Harry S. Gaither
J. C. Carpenter
Inventor:
Franklyn J. Wolff
by Munday Evarts Adcock
& Clarke Atty

UNITED STATES PATENT OFFICE.

FRANKLYN J. WOLFF, OF CHICAGO, ILLINOIS.

MEASURING DEVICE.

1,178,896.  Specification of Letters Patent.  Patented Apr. 11, 1916.

Application filed November 9, 1914. Serial No. 870,981.

*To all whom it may concern:*

Be it known that I, FRANKLYN J. WOLFF, a citizen of the United States, residing in Chicago, in the county of Cook and State of Illinois, have invented a new and useful Improvement in Measuring Devices, of which the following is a specification.

My invention relates in general to measuring devices and more particularly to calipers designed for use in measuring inside and outside dimensions between or behind obstructions, which obstructions prevent the removal of the calipers after being set for subsequent reading.

A principal object of the device is to provide a measuring device for the taking of inside and outside measurements while the dimension determining or defining parts of the device are in contact with the part being measured, thereby permitting the taking of accurate measurements of thicknesses of material and the like behind and between flanges and other obstructions and also permitting the taking of accurate measurements of internal passageways of non-continuous form.

A further object of the invention is the provision of such a device which may be readily collapsed and carried in the pocket of the owner or user. Still another object of the invention is the provision of such a device consisting of a few and simple parts strongly and cheaply constructed and easily operable.

Other objects and advantages of the invention will be apparent as it is better understood from the following description when considered in connection with the accompanying drawing illustrating a preferred embodiment thereof.

On the drawing Figure 1 is a side elevation of a measuring device embodying my invention; Fig. 2 is a similar view showing the parts arranged in different relation; and Fig. 3 is a view taken at right angles to Fig. 1 from the right, only the upper portion of the device being shown.

The embodiment of my invention shown on the drawing consists primarily of two S-shaped arms 4 and 5, to one of which is pivotally connected a scale 6. The S-shaped arms 4 and 5 are oppositely arranged and are pivoted intermediate their ends at 7. The scale 6 is secured upon a pivot arm 8 with its zero points arranged at and opposite the pivotal axis of the pivot arm 8. The graduations on this scale are such that dimensions defined at the points 9 and 10 of the S-shaped members 8, that is to say, the points located at adjacent ends of the arms 5 and 7, may read on the scale at the point 11 of the free ends of the S-shaped arms at the other side of the pivotal connections 7. In the present instance, the pivotal connection is located centrally of each arm 4 and 5, although it may be otherwise located with a corresponding change in the scale graduations 12 on the scale. The ends 14, 15 and 16 of the arms which are the ends provided with the points 9, 10 and 11 are rounded so that the arms only come in contact with the article being measured and the arm crosses the scale graduations. The end 17 on the arm 5 on which the scale is pivotally secured to the pivot arm 8 is depressed near its end at 18 so that the scale which is secured upon the outer face of the pivot arm 8 may be disposed substantially in the plane of the arm 5, thereby bringing a smooth even contact between the rear face of the end 16 and the scale when the parts are arranged for service.

When the outside dimensions are desired the parts are arranged as shown in Fig. 1, the scale extending toward the right and beneath the adjacent end 16 of the arm 4. When, however, it is desired to change the arrangement to take an inside dimension, the scale is swung upwardly to the left through substantially 180° into the position shown in Fig. 2 and the two arms 4 and 5 are moved past each other until the end 16 is disposed over the scale again. The ends 15 and 14 pass each other in this movement and dimensions may now be taken internally between the points 9 and 10 as before. Reading is had in both arrangements of the device on the same set of graduations 12 on the scale which are arranged along one edge as shown. Other graduations 19 may be arranged along the other edge for straight linear measurements if desired. All the graduations may be arranged in various other ways without departing from the spirit and scope of my invention. The measuring device may be arranged between its periods of use to be carried in the pocket of the owner or user. This is done by moving the scale upwardly until it clears the end 16 of the arm 4, then moving it downwardly on top of this arm into the position shown in dotted lines at 20 in Fig. 1. The arm 4 may then be brought to the position shown in dotted lines at 21 in this figure, thereby arranging the parts in collapsed relation for insertion in the pocket. It will be manifest that the device consists only of three main parts which may be cheaply constructed and assembled.

It is thought that the invention and many of its attendant advantages will be understood from the foregoing description, and it will be apparent that various changes may be made in the form, construction and arrangement of the parts without departing from the spirit and scope of the invention or sacrificing any of its material advantages, the form hereinbefore described being merely a preferred embodiment thereof.

I claim:—

1. A measuring device comprising a pair of arms pivoted together at their centers, said arms having curved ends on one side of their pivotal connection, adapted when in one relation to determine inside dimensions and when swung past each other into a second relation to determine outside dimensions, a scale pivoted at one end to the other end of one of said arms and adapted to underlie the adjacent end of the other arm in all positions of the first named arms.

2. A measuring device comprising a pair of arms pivoted together intermediate their ends, said arms having curved ends on one side of their pivotal connection, adapted when in one relation to determine inside dimensions and when swung past each other into a second relation to determine outside dimensions, a scale pivoted at one end to the other end of one of said arms and adapted to underlie the adjacent end of the other arm in all positions of the first named arms.

3. A measuring device comprising a pair of arms pivoted together at their centers and adapted when in one position to measure outside dimensions and when in another position to measure inside dimensions between the same adjacent ends of said arms, and a swinging scale pivoted to the opposite end of one of said arms with its zero point located at its pivotal axis and adapted to underlie the adjacent end of the other arm in all positions of said arms.

Signed in the presence of two subscribing witnesses.

FRANKLYN J. WOLFF.

Witnesses:
JOHN H. GAVIN,
GEORGE SHWARTZ.